US011321320B2

(12) United States Patent
Azaria et al.

(10) Patent No.: US 11,321,320 B2
(45) Date of Patent: May 3, 2022

(54) SYSTEM AND METHOD FOR APPROXIMATING QUERY RESULTS USING NEURAL NETWORKS

(71) Applicant: Sisense Ltd., Ramat Gan (IL)

(72) Inventors: Adi Azaria, Tel Aviv (IL); Amir Orad, Scarsdale, NY (US); Nir Regev, Beit Guvrin (IL); Guy Levy Yurista, Rockville, MD (US)

(73) Assignee: Sisense Ltd., Ramat Gan (IL)

( * ) Notice: Subject to any disclaimer, the term of this patent is extended or adjusted under 35 U.S.C. 154(b) by 1099 days.

(21) Appl. No.: 15/858,957

(22) Filed: Dec. 29, 2017

(65) Prior Publication Data
US 2019/0050726 A1 Feb. 14, 2019

Related U.S. Application Data

(60) Provisional application No. 62/545,046, filed on Aug. 14, 2017, provisional application No. 62/545,050, (Continued)

(51) Int. Cl.
*G06F 16/2453* (2019.01)
*G06N 3/08* (2006.01)
(Continued)

(52) U.S. Cl.
CPC ...... *G06F 16/24549* (2019.01); *G06F 16/248* (2019.01); *G06F 16/2455* (2019.01);
(Continued)

(58) Field of Classification Search
CPC ...... G06N 3/0445; G06N 3/0454; G06N 3/06; G06N 3/08; G06N 3/084; G06F 16/24549;
(Continued)

(56) References Cited

U.S. PATENT DOCUMENTS 5,111,531 A  5/1992  Grayson et al.
5,515,477 A  5/1996  Sutherland
(Continued)

FOREIGN PATENT DOCUMENTS

CN  106547828 A  3/2017
WO  2017176356 A2  10/2017
WO  2018200979 A1  11/2018

OTHER PUBLICATIONS

Doulamis, et al., "On-Line Retrainable Neural Networks: Improving the Performance of Neural Networks in Image Analysis Problems", IEEE Transactions on Neural Networks, vol. 11, No. 1, Jan. 2000 (Year: 2000).*

(Continued)

*Primary Examiner* — Tsu-Chang Lee
(74) *Attorney, Agent, or Firm* — M&B IP Analysts, LLC

(57) ABSTRACT

A system and method for generating approximations of query results. The method includes sending a received query to a neural network, wherein the received query is executable on a target data set; receiving from the neural network a predicted result to the received query; providing the predicted result as a first output to a device having initiated the received query; determining a real result of the query from a data set stored in the database when the predicted result is insufficiently accurate; and providing the real result as a second output to a device having initiated the received query.

20 Claims, 7 Drawing Sheets

Related U.S. Application Data filed on Aug. 14, 2017, provisional application No. 62/545,053, filed on Aug. 14, 2017, provisional application No. 62/545,058, filed on Aug. 14, 2017.

(51) Int. Cl.

| | |
|---|---|
| *G06F 16/248* | (2019.01) |
| *G06F 16/2458* | (2019.01) |
| *G06N 3/04* | (2006.01) |
| *G06F 16/2455* | (2019.01) |
| *G06F 16/903* | (2019.01) |
| *G06N 3/06* | (2006.01) |

(52) U.S. Cl.
CPC ........ *G06F 16/2462* (2019.01); *G06F 16/903* (2019.01); *G06F 16/90335* (2019.01); *G06N 3/0445* (2013.01); *G06N 3/0454* (2013.01); *G06N 3/06* (2013.01); *G06N 3/08* (2013.01); *G06N 3/084* (2013.01)

(58) Field of Classification Search
CPC ............. G06F 16/903; G06F 16/90335; G06F 16/2455; G06F 16/2462; G06F 16/248
USPC ......................................................... 706/17
See application file for complete search history.

(56) References Cited

U.S. PATENT DOCUMENTS

| | | | |
|---|---|---|---|
| 6,108,648 | A | 8/2000 | Lakshmi et al. |
| 7,181,438 | B1 | 2/2007 | Szabo |
| 7,831,531 | B1 | 11/2010 | Baluja et al. |
| 9,336,483 | B1 | 5/2016 | Abeysooriya et al. |
| 9,514,389 | B1 | 12/2016 | Erhan et al. |
| 10,311,372 | B1 | 6/2019 | Hotchkies et al. |
| 10,635,680 | B2 | 4/2020 | Jiang et al. |
| 10,706,354 | B2 | 7/2020 | Corvinelli et al. |
| 10,713,594 | B2 * | 7/2020 | Szeto ................... G06F 11/1448 |
| 10,878,334 | B2 | 12/2020 | Lindner |
| 10,929,751 | B2 | 2/2021 | Ehrman et al. |
| 10,977,581 | B2 | 4/2021 | Maor et al. |
| 11,115,463 | B2 | 9/2021 | Cudworth et al. |
| 2004/0093315 | A1 | 5/2004 | Carney |
| 2006/0230006 | A1 | 10/2006 | Buscema |
| 2007/0168329 | A1 | 7/2007 | Haft et al. |
| 2013/0117257 | A1 | 5/2013 | Meijer et al. |
| 2014/0156633 | A1 | 6/2014 | Duan et al. |
| 2014/0344203 | A1 * | 11/2014 | Ahn ....................... G06N 3/084 706/25 |
| 2015/0100955 | A1 | 4/2015 | Chen et al. |
| 2015/0278709 | A1 | 10/2015 | Zeng et al. |
| 2016/0162781 | A1 | 6/2016 | Lillicrap et al. |
| 2017/0109355 | A1 | 4/2017 | Li et al. |
| 2017/0357896 | A1 | 12/2017 | Tsatsin et al. |
| 2018/0082183 | A1 | 3/2018 | Hertz et al. |
| 2018/0157758 | A1 | 6/2018 | Arrizabalaga et al. |
| 2018/0268015 | A1 * | 9/2018 | Sugaberry ............... G06N 5/003 |
| 2018/0329951 | A1 | 11/2018 | Yu et al. |
| 2018/0341862 | A1 | 11/2018 | Ehrman |
| 2018/0357240 | A1 | 12/2018 | Miller et al. |
| 2019/0050724 | A1 | 2/2019 | Regev et al. |
| 2019/0050725 | A1 | 2/2019 | Yurista et al. |
| 2019/0050726 | A1 | 2/2019 | Azaria et al. |
| 2019/0180195 | A1 | 6/2019 | Terry et al. |
| 2020/0125950 | A1 | 4/2020 | Regev |
| 2020/0142888 | A1 | 5/2020 | Alakuijala et al. |

OTHER PUBLICATIONS

The International Search Report and the Written Opinion for PCT/US2017/069069, ISA/RU, Moscow, Russia, dated Jun. 7, 2018.

The European Search Report for European Patent Application No. 17921683.3, dated Aug. 17, 2020, EPO, Munich, Germany.

The International Search Report and The Written Opinion for PCT/US2017/069067, ISA/RU, Moscow, Russia, dated May 17, 2018.

The International Search Report and The Written Opinion of the International Searching Authority for PCT/US2017/069071, dated Apr. 26, 2018, ISA/RU, Moscow, Russia.

Anagnostopoulos, et. al., "Efficient Scalable Accurate Regression Queries in In-DBMS Analytics", IEEE International Conference on Data Engineering (ICDE), 2017.

Melucci, Massimo, "Impact of Query Sample Selection Bias on Information Retrieval System Ranking" IEEE International Conference on Data Science and Advanced Analytics (DSAA), Oct. 17-19, 2016.

Yang, et. al., "A Variance Maximization Criterion for Active Learning", Pattern Recognition Library, Jun. 23, 2017.

Yuan, et. al., "Optimizing Batch Linear Queries under Exact and Approximate Differential Privacy," ACM Transactions on Database Systems, vol. 40, No. 2, Article 11, Jun. 2015.

Brownlee, Jason, "A Gentle Introduction to Statistical Data Distributions" A Stata Press Publication: StataCorp LP, Jun. 8, 2018, pp. 1-20.

First Foreign Office Action for European Application No. 17921683. 3, dated Jun. 17, 2021, European Patent Office.

Chang et al., "Active Bias: Training More Accurate Neural Networks by Emphasizing High Variance Samples", arXiv: 1704. 07433v2, May 22, 2017, pp. 1-15.

Cohen et al., "A Minimal Variance Estimator for the Cardinality of Big Data Set Intersection" arXiv: 1606.00996v1., Jun. 3, 2016.

Cohen et al., :A Minimal Variance Estimator for the Cardinality of Big Data Set Intersection, KDD 2017 Research Paper, Aug. 13-17, 2017, pp. 95-103.

Hendrycks et al., "Adjusting for Dropout Variance in Batch Normalization and Weight Initialization", arXiv: 1607.02488v2, Mar. 23, 2017, pp. 1-10.

Ivanov et al., "Adaptive Cardinality Estimation", arXiv:1711. 08330v1, Nov. 22, 2017, pp. 1-12.

Katharopoulos et al., "Biased Importance Sampling for Deep Neural Network Training", arXiv: 1706.00043v1, Sep. 13, 2017, pp. 1-12.

Loshchilov et al., "Online Batch Selection for Faster Training of Neural Networks", arXiv: 1511.06343v4, Apr. 25, 2016, pp. 1-20.

Wang et al., "Relevance Feedback Technique for Content-Based Image Retrieval Using Neural Network Learning" Proceedings of the Fifth International Conference on Machine Learning and Cybernetics, Dalian, Aug. 13-16, 2006.

Wang et al., "Synthesizing Highly Expressive SQL Queries from Input-Output Examples", Jun. 2017, pp. 452-466.

Xiong et al., "End-to-End Neural Ad-hoc Ranking with Kernel Pooling", arXiv:1706.06613v1, Jun. 20, 2017.

Xu et al., "SQLNet: Generating Structured Queries from Natural Language without Reinforcement Learning", arXiv: 1711.0443v1, Nov. 13, 2017, pp. 1-13.

Yegulalp, Serdar, "Machine learning comes to your browser via JavaScript", InfoWorld, Aug. 2, 2017.

\* cited by examiner

SYSTEM AND METHOD FOR APPROXIMATING QUERY RESULTS USING NEURAL NETWORKS

CROSS-REFERENCE TO RELATED APPLICATIONS

This application claims the benefit of the following applications:
- U.S. Provisional Application No. 62/545,046 filed on Aug. 14, 2017;
- U.S. Provisional Application No. 62/545,050 filed on Aug. 14, 2017;
- U.S. Provisional Application No. 62/545,053 filed on Aug. 14, 2017; and
- U.S. Provisional Application No. 62/545,058 filed on Aug. 14, 2017.

All of the applications referenced above are herein incorporated by reference.

TECHNICAL FIELD

The present disclosure relates generally to generating query results from databases, and particularly to generating query results based on a neural network.

BACKGROUND

It is becoming increasingly more resource intensive to produce useful results from the growing amount of data generated by individuals and organizations. Business organizations in particular can generate petabytes of data and could benefit greatly from mining such data to extract useful insights from their generated data that is automatically gathered and stored in the course of usual business operations.

A typical approach in attempting to gain insight from data includes querying a database storing the data to get a specific result. For example, a user may generate a query (e.g., an SQL query) and the query is sent to a database management system (DBMS) that executes the query on one or more tables stored on the database. This is a relatively simple case; however, with organizations relying on a multitude of vendors for managing their data, each with their own technology for storing data, retrieving useful insights from data is becoming ever increasingly complex. It is also not uncommon for queries to take several minutes, or even hours, to complete when applied to vast amounts of stored data.

The advantages to speeding up the process of data mining are clear, and some solutions attempt to accelerate access to the databases. For example, one solution includes indexing data stored in databases. Another solution includes caching results of frequent queries. Yet another solution includes selectively retrieving results from the database, so that the query could be served immediately.

However, while these database optimization and acceleration solutions are useful in analyzing databases of a certain size or known data sets, they can fall short of providing useful information when applied to large databases and unknown data sets, which may include data that an indexing or caching algorithm has not been programmed to process.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for generating approximations of query results. The method includes sending a received query to a neural network, wherein the received query is executable on a target data set; receiving from the neural network a predicted result to the received query; providing the predicted result as a first output to a device having initiated the received query; determining a real result of the query from a data set stored in the database when the predicted result is insufficiently accurate; and providing the real result as a second output to a device having initiated the received query.

Certain embodiments disclosed herein also include a non-transitory computer readable medium having stored thereon instructions for causing a processing circuitry to perform a process. The process includes sending a received query to a neural network, wherein the received query is executable on a target data set; receiving from the neural network a predicted result to the received query; providing the predicted result as a first output to a device having initiated the received query; determining a real result of the query from a data set stored in the database when the predicted result is insufficiently accurate; and providing the real result as a second output to a device having initiated the received query.

Certain embodiments disclosed herein also include a system for generating approximations of query results. The system includes an approximation server; a neural network; and wherein the approximation server is configured to: send a received query to a neural network, wherein the received query is executable on a target data set; receive from the neural network a predicted result to the received query; provide the predicted result as a first output to a device having initiated the received query; determine a real result of the query from a data set stored in the database when the predicted result is insufficiently accurate; and provide the real result as a second output to a device having initiated the received query.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
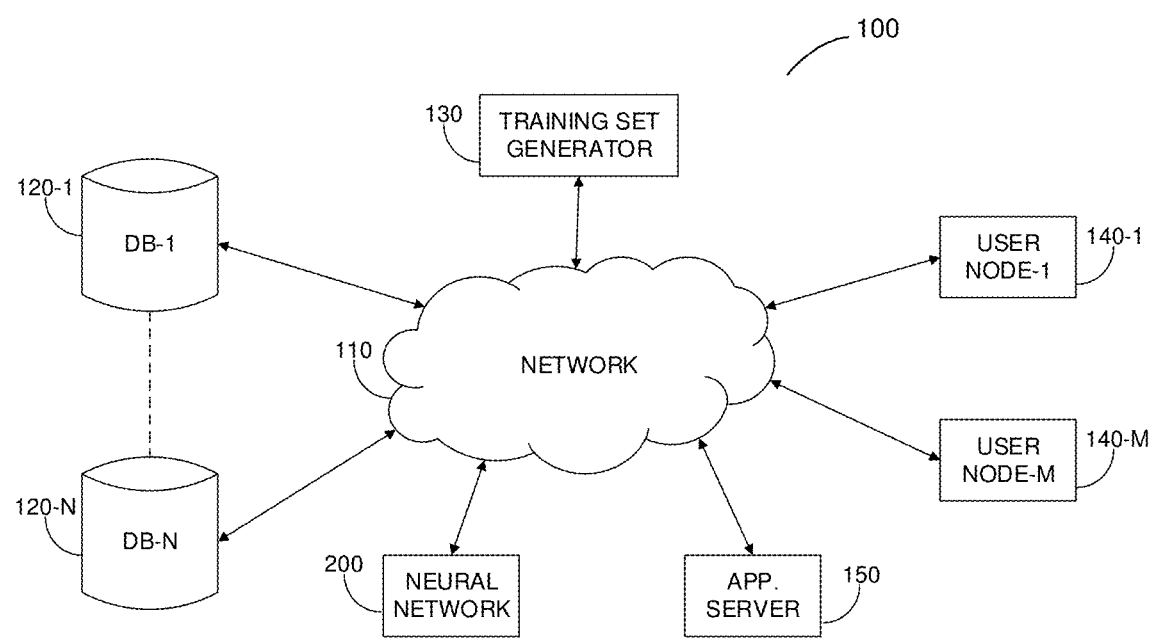
FIG. 1A shows a network diagram of a system for approximating query results according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1A shows a network diagram 100 of a system for approximating query results according to an embodiment. A network 110 is provided, which may include the Internet, the world-wide-web (WWW), a local area network (LAN), a wide area network (WAN), a metro area network (MAN), a mobile network, and other networks capable of enabling communication between elements of a system 100. The network 110 provides connectivity to one or more databases 120-1 to 120-N, where N is an integer greater than or equal to 1, a training set generator 130, one or more user nodes 140-1 to 140-M, where M is an integer greater than or equal to 1, an approximation server 150, and neural network 200.

The one or more databases 120-1 through 120-N (hereinafter referred to as database 120 or databases 120, merely for simplicity) may store one or more structured data sets. In some embodiments, a database 120 may be implemented as any one of: a distributed database, data warehouse, federated database, graph database, columnar database, and the like. A database 120 may include a database management system (DBMS), not shown, which manages access to the database. In certain embodiments, a database 120 may include one or more tables of data.

The network 110 is connected to the neural network (NN) 200 and, in some embodiments, the training set generator 130. The NN 200 may be implemented as a recurrent NN (RNN). In an embodiment, a plurality of NNs may be implemented. For example, a second NN may have more layers than a first NN, as described herein below. The second NN may generate predictions with a higher degree of certainty (i.e., have a higher confidence level) than the first NN, while requiring more memory to store its NN model than the first NN.

The network 110 is further connected to a plurality of user nodes 140-1 through 140-M (hereinafter referred to as user node 140 or user nodes 140, merely for simplicity). A user node 140 may be a mobile device, a smartphone, a desktop computer, a laptop computer, a tablet computer, a wearable device, an Internet of Things (IoT) device, and the like. The user node 140 is configured to send a query to be executed on one or more of the databases 120. In an embodiment, a user node 120 may send the query directly to a database 120, to be handled, for example by the DBMS. In a further embodiment, the query is sent to an approximation server 150.

The training set generator 130 is configured to receive, for example from a DBMS of a database 120, a plurality of training queries, from which to generate a training set for the neural network 200. An embodiment of the training set generator 130 is discussed in more detail with respect to FIG. 5.

In an embodiment, the approximation server 150 is configured to receive queries from the user nodes 140, and send the received queries to be executed on the appropriate databases 120. The approximation server 150 may also be configured to provide a user node 140 with an approximate result, generated by the NN 200. This is discussed in more detail below with respect to FIG. 2.

The approximation server 150 may include a processing circuitry (not shown) that may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In an embodiment, the approximation server 150 may further include memory (not shown) configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry to perform the various processes described herein.

Figure 1B:
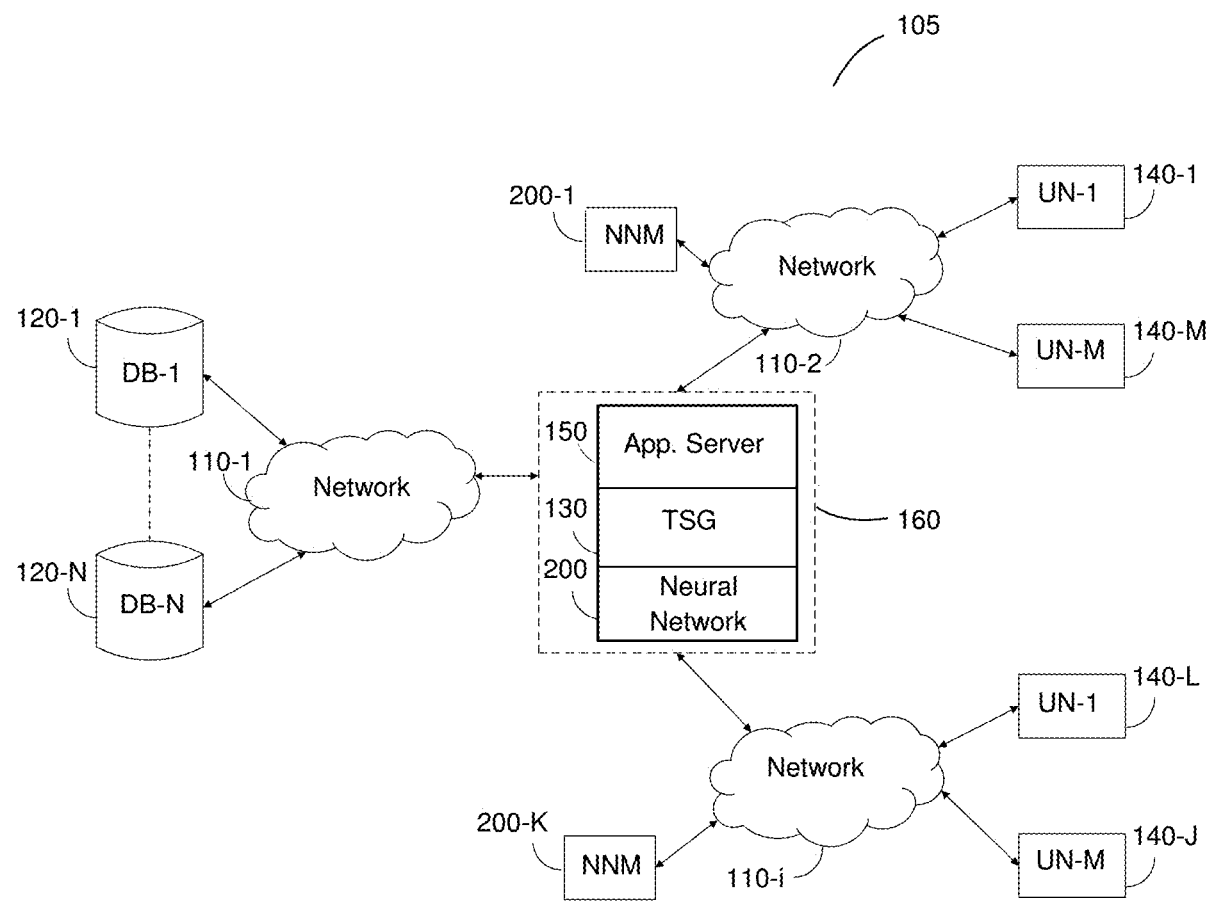
FIG. 1B shows a network diagram of a system for approximating query results according to another embodiment.

FIG. 1B shows a network diagram 105 of a system for approximating query results according to another embodiment. In the shown embodiment, multiple networks are employed for approximating the query results. A first network 110-1 is connected to databases 120 and a second network 110-2 is connected to one or more user nodes (UN) 140-1 through 140-M and a neural network machine 200-1. The first network 110-1 and the second network 110-2 are each further connected to a central link 160.

In one embodiment, the central link 160 includes an approximation server 150, a training set generator (TSG) 130, and a neural network 200. In a further embodiment, the approximation server 150 includes the training set generator 130 and the neural network 200. In other deployments, additional networks 110-i are further connected to the central link 160. Specifically, each additional network 110-i is connected to one or more user nodes 140-L through 140-J and a local neural network machine 200-K. In the exemplary embodiment, 'M', 'N', 'i', 'J', 'K' and 'L' are integers greater than or equal to 1.

The second network 110-2 and each additional network 110-i may include local networks, such as, but not limited to, virtual private network (VPNs), local area network (LANs), and the like. Each local network includes a local NN machine 200-1 through 200-K for storing a NN model, which is generated by the approximation server 150. In an example, a NN model may be stored on one or more of the user nodes 140-1 through 140-M, which are communicatively connected to the local network 110-1. The user node 140-1 is configured to send a query to be executed on one or more of the databases 120 either directly (not shown) or via the approximation server 150 of the central link 160. The approximation server 150 may be configured to provide the user node 140-1 with an approximate result generated by the NN 200.

In some embodiments, a first NN and second NN are trained on a data set of one or more databases 120. For example, the first NN may include fewer layers and neurons than the second NN. The first NN may be stored in one or more local NN machines 200-1 through 200-K, such as local NN machine 200-1, and the second NN may be stored on the approximation server 150, e.g. the neural network 200. When a user node 140-1 sends a query for execution, the first NN stored on local NN machine 200-1 may provide an initial predicted result to the user node 140-1. The approximation server 150 will then provide a second predicted result having a greater accuracy than the initial predicted result. In some embodiments, the approximation server 150 may send the query for execution on the data set from the database 120, and provide the real result to the user node 140-1.

In an embodiment, the first NN is executed on a user node only if the user node has the computational resources, e.g., sufficient processing power and memory, to efficiently execute the query on the second neural network. If not, then the user node may be configured to either access a local machine (e.g., a dedicated machine, or another user node on the local network) to generate predictions from a local neural network, or be directed to the approximation server 150 of the central link 160.

It should be appreciated that the arrangement discussed with reference to FIG. 1B allows for a more efficient response to a query than sending a query directly to a database 120 for a real result, as the time required to receive a result is reduced by providing an initial approximation, a more accurate second approximation, and finally a real result. It should be further appreciated that using a plurality of neural networks allows for increasingly accurate results to be obtained. It should be further noted that implementing the neural network on a local machine or even a user device allows for significant reduction of the storage required to maintain the data. For example, a typical size of neural network can be in the tens of megabytes comparable to a database (maintaining substantially the same data) having a size of hundreds of gigabytes.

Figure 2:
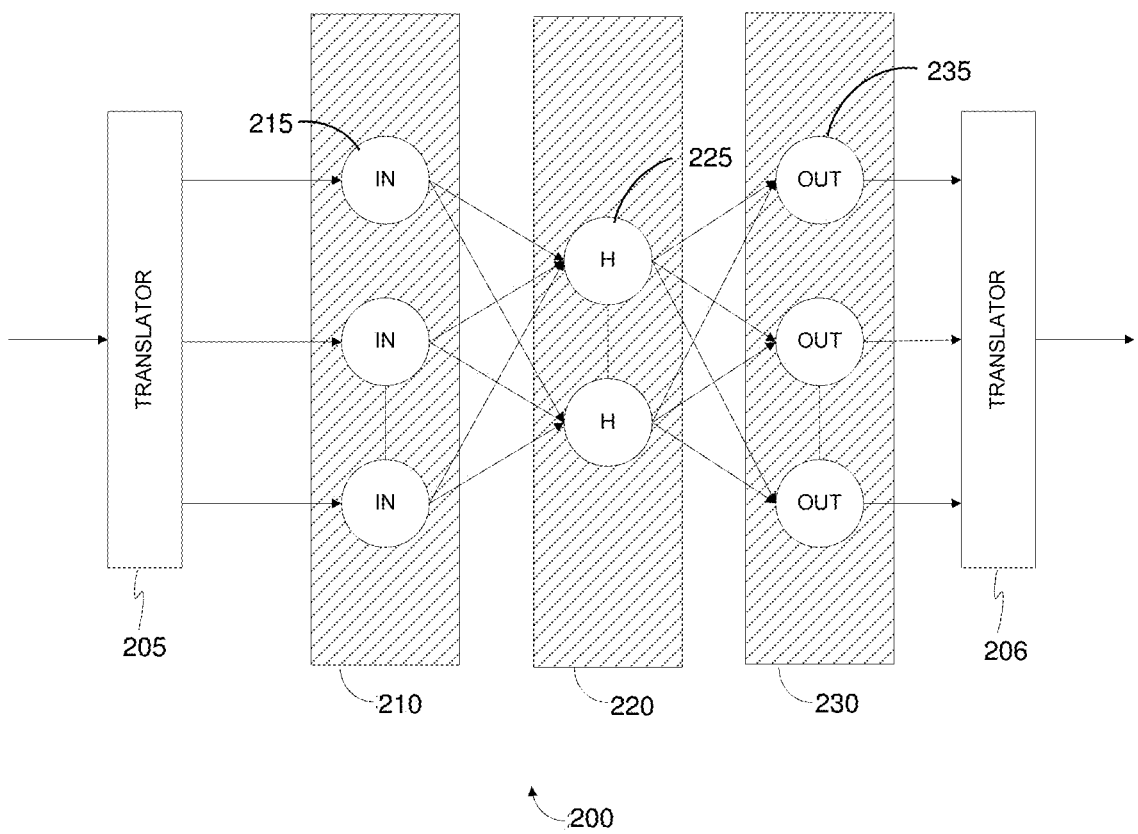
FIG. 2 is a schematic diagram of a neural network for generating approximate results for a database query, according to an embodiment.

FIG. 2 is a schematic diagram of a neural network (NN) 200 for generating approximate results for a database query, according to an embodiment. A neural network 200 includes an input numerical translator matrix 205. The input numerical translator matrix 205 is configured to receive a query and translate the query to a numerical representation which can be fed into an input neuron 215 of a neural network 200.

The input numerical translator matrix 205 is configured to determine what elements, such as predicates and expressions, are present in the received query. In an embodiment, each element is mapped by an injective function to a unique numerical representation. For example, the input numerical translator matrix 205 may receive a query and generate, for each unique query, a unique vector. The unique vectors may be fed as input to one or more of input neurons 215, which together form an input layer 210 of the neural network 200.

Each neuron (also referred to as a node) of the neural network 200 is configured to apply a function to its input, sending the output of the function forward (e.g., to another neuron), and may include a weight function. A weight function of a neuron determines the amount of contribution a single neuron has on the eventual output of the neural network. The higher a weight value is, the more effect the neuron's computation carries on the output of the neural network.

The neural network 200 further includes a plurality of hidden neurons 225 in a hidden layer 220. In this exemplary embodiment, a single hidden layer 220 is shown, however a plurality of hidden layers may be implemented, without departing from the scope of the disclosed embodiments.

In an embodiment, the neural network 200 is configured such that each output of an input neuron 215 of the input layer 210 is used as an input of one or more hidden neurons 225 in the hidden layer 220. Typically, all outputs of the input neurons 215 are used as inputs to all the hidden neurons 225 of the hidden layer 220. In embodiments where a plurality of hidden layers is implemented, the output of the input layer 210 is used as the input for the hidden neurons of a first hidden layer.

The neural network 220 further includes an output layer 230, which includes one or more output neurons 235. The output of the hidden layer 220 is the input of the output layer 230. In an embodiment where a plurality of hidden layers is implemented, the output of the final hidden layer is the input of the output layer's 230 output neurons 235. In some embodiments, the output neurons 235 of the output layer 230 may provide a result to an output numerical translator matrix 206, which is configured to translate the output of the output layer 230 from a numerical representation to a query result. The result may then be sent to a user node which has sent the query.

In some embodiments, the neural network 200 may be stored on one or more user nodes (e.g., the user nodes 140 of FIGS. 1A and 1B). This could allow, for example, a user of the user node to receive a response to a query faster than if the query was sent to be executed on a remote database. Additionally, the neural network 220 can be stored within a central link (e.g., the central link 160 of FIG. 1), where multiple local network can access the neural network 200. While the result may not always be as accurate as querying the data directly for real results, using the neural network 200 allows the user of a user node to receive a faster response with an approximated result above a predetermined level of accuracy.

A neural network 200 may be trained by executing a number of training queries and comparing the results from the neural network 200 to real results determined from querying a database directly. The training of a neural network 200 is discussed in further detail below regarding FIG. 5. In an embodiment, a neural network 200 may further include a version identifier, indicating the amount of training data the neural network 200 has received. For example, a higher version number may indicate that a first neural network contains a more up-to-date training than a second neural network with a lower version number. The up-to-date version of a neural network may be stored on an approximation server, e.g., the approximation server 150 of FIGS. 1A and 1B.

In an embodiment, a user node may periodically poll the approximation server to check if there is an updated version of the neural network. In another embodiment, the approximation server may push a notification to one or more user nodes to indicate that a new version on the neural network is available, and downloadable over a network connection. In some embodiments, the approximation server may have stored therein a plurality of trained neural networks, wherein each neural network is trained on a different data set. While a plurality of neural networks may be trained on different data sets, it is understood that some overlap may occur between data sets.

It should be noted that the neural network discussed with reference to FIG. 1 can be executed over or realized by a general purpose or dedicated hardware. Examples for such hardware include analog or digital neuro-computers. Such computers may be realized using any one of a combination of electronic components, optical components a von-Neumann multiprocessor, a graphical processing unit (GPU), a vector processor, an array processor, a tensor processing unit, and the like.

Figure 3:
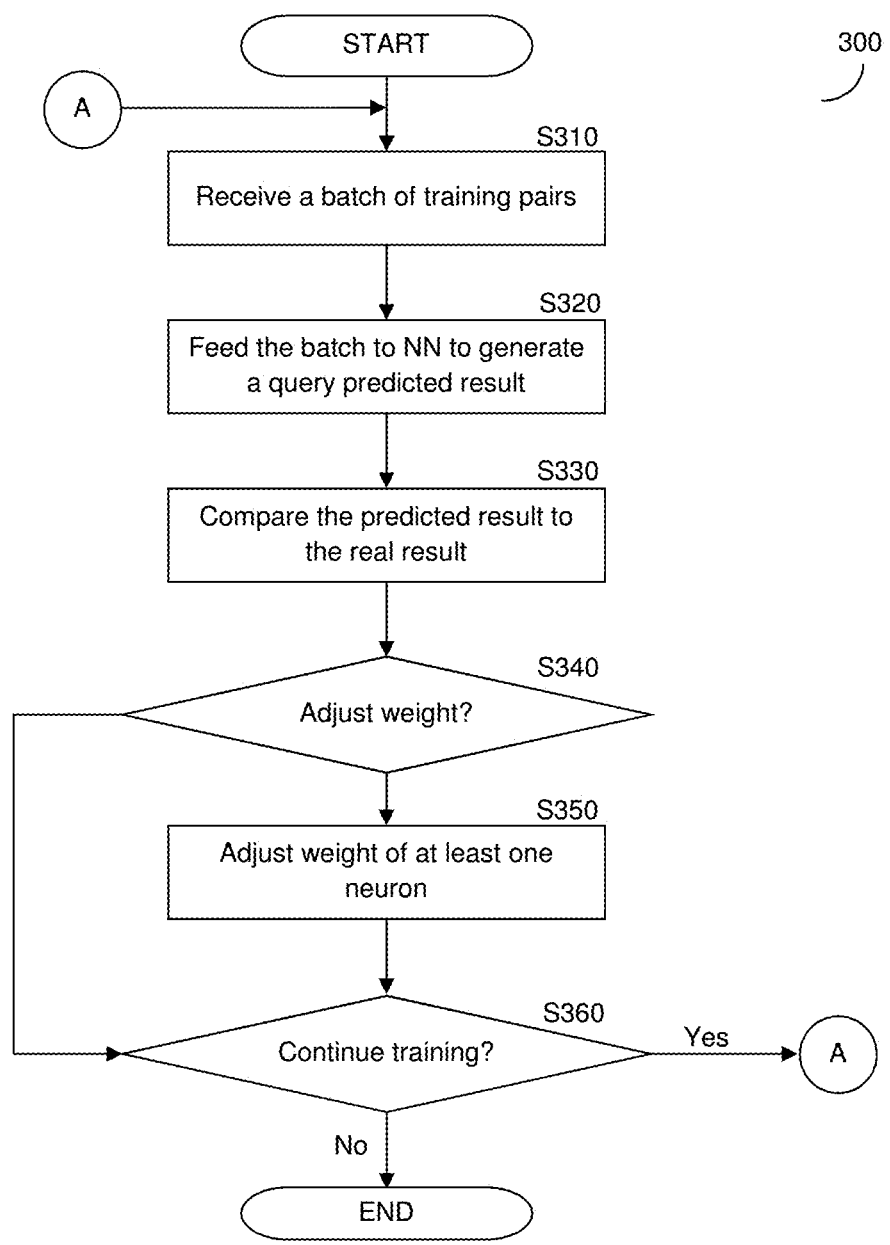
FIG. 3 is a flowchart illustrating a method for training a neural network to approximate results for queries related to a data set according to an embodiment.

FIG. 3 is a flowchart illustrating a method 300 for training a neural network to approximate results for queries related to a data set according to an embodiment. At S310, a batch of training query pairs is received, e.g., by the approximation server 150 of FIGS. 1A and 1B. In an embodiment, the batch of training queries is generated by a training set generator and includes a plurality of both queries and their matching real results. The real result of the query may be previously generated by executing the query directly on a data set. The query includes query elements, which include, for example, predicates and expressions. A real result of the query may be, for example, an alphanumerical string or a calculated number value. In an embodiment, a query may be related to all, or part, of a data set. For example, a query directed to a columnar database may be executed based on a subset of columns of a table which does not include all columns of the table. Typically, the query pairs are vectorized to a format which the neural network is able to process, for example, by an input numerical translator matrix (e.g., as shown in FIG. 2).

At S320, the batch of training queries is fed to a neural network to generate a predicted result for each query. The neural network is configured to receive a batch of training queries, where a plurality of batches is called an epoch. The queries may be fed through one or more layers within the neural network. For example, a query may be fed through an input layer, a hidden layer, and an output layer. In an embodiment, each query is first fed to an input numerical translator matrix to determine elements present within the query. Each element is mapped, e.g., by an injective function, to a numerical representation, such as a vector. The vectors may be fed to one or more neurons, where each neuron is configured to apply a function to the vector, where the function includes at least a weight function. In an example embodiment, the weight function determines the contribution of each neuron function toward a final query predicted result.

At S330, a comparison is made between the predicted result of a query and the real result of that query. The comparison includes determining the differences between the predicted result and the real result. For example, if the real result is a number value, the comparison includes calculating the difference between a number output value from the predicted result and the number value of the real result.

At S340, a determination is made if a weight of one or more of the neurons of the neural network should be adjusted. The determination may be made, for example, if the difference between the first predicted result and the first real result exceeds a first threshold. For example, if the difference of number value exceeds 15%, it may be determined to exceed the first threshold. If it is determined that the weight should be adjusted, execution continues at S350, otherwise execution continues at S360.

At S350, the weight of a neuron is adjusted via a weight function. The weight of a neuron determines the amount of contribution a single neuron has on the eventual output of the neural network. The higher a weight value is, the more effect the neuron's computation carries on the output of the neural network. Adjusting weights may be performed, for example, by methods of back propagation. One example for such a method is a "backward propagation of errors," which is an algorithm for supervised learning of neural networks using gradient descent. Given an artificial neural network and an error function, the method calculates the gradient of the error function with respect to the neural network's weights.

At S360, it is determined if the training for the neural network should continue. In an embodiment, training will end if an epoch has been fully processed, i.e., if the entire plurality of batches has been processed via the neural network. If the epoch has not ended, execution continues at S310 where a new batch is fed to the neural network; otherwise execution terminates. In some embodiments, a check is performed to determine the number of epochs which the system has processed. The system may generate a target number of epochs to train the neural network with, based on the amount of training queries generated, the variance of the data set, the size of the data set, and the like.

Figure 4:
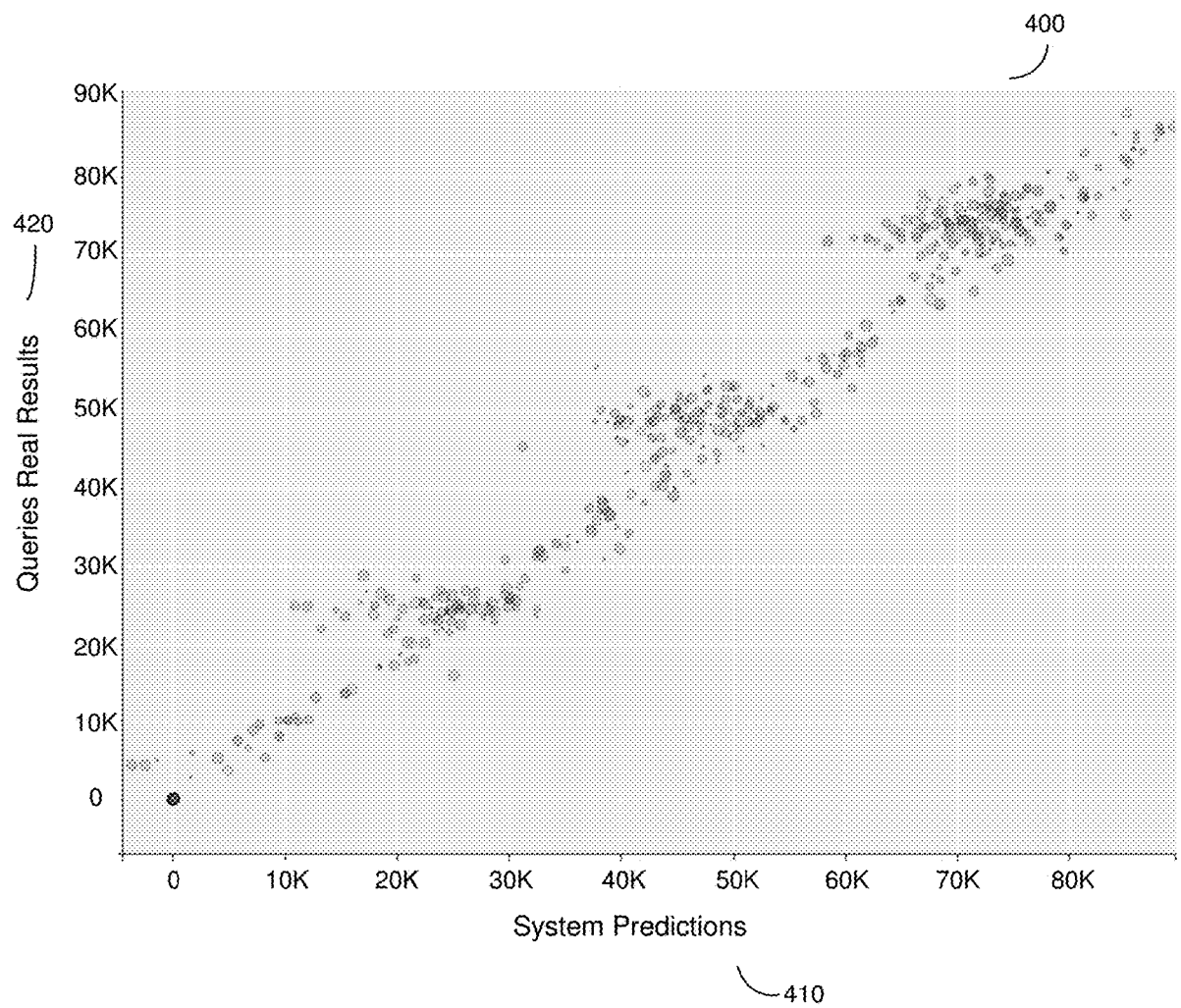
FIG. 4 is an example graph showing real query results plotted against predictions of a neural network according to an embodiment.

FIG. 4 is an example graph 400 showing real query results 420 plotted against predictions 410 of a neural network according to an embodiment. An ideal version of the graph should be linear, where the neural network would accurately predict a real result. As the neural network is trained, i.e., as batches of training query pairs are processed by the neural network, the graph should converge to a linear function.

In the exemplary embodiment of the method presented in FIG. 3, at S360, the determination to continue the training process may include plotting the predicted results against the real results, determining a function, and performing a regression of that function, to determine if it is sufficiently linear. Sufficiently linear may be, for example, if the $R^2$ value of the regression is above a predetermined threshold.

Figure 5:
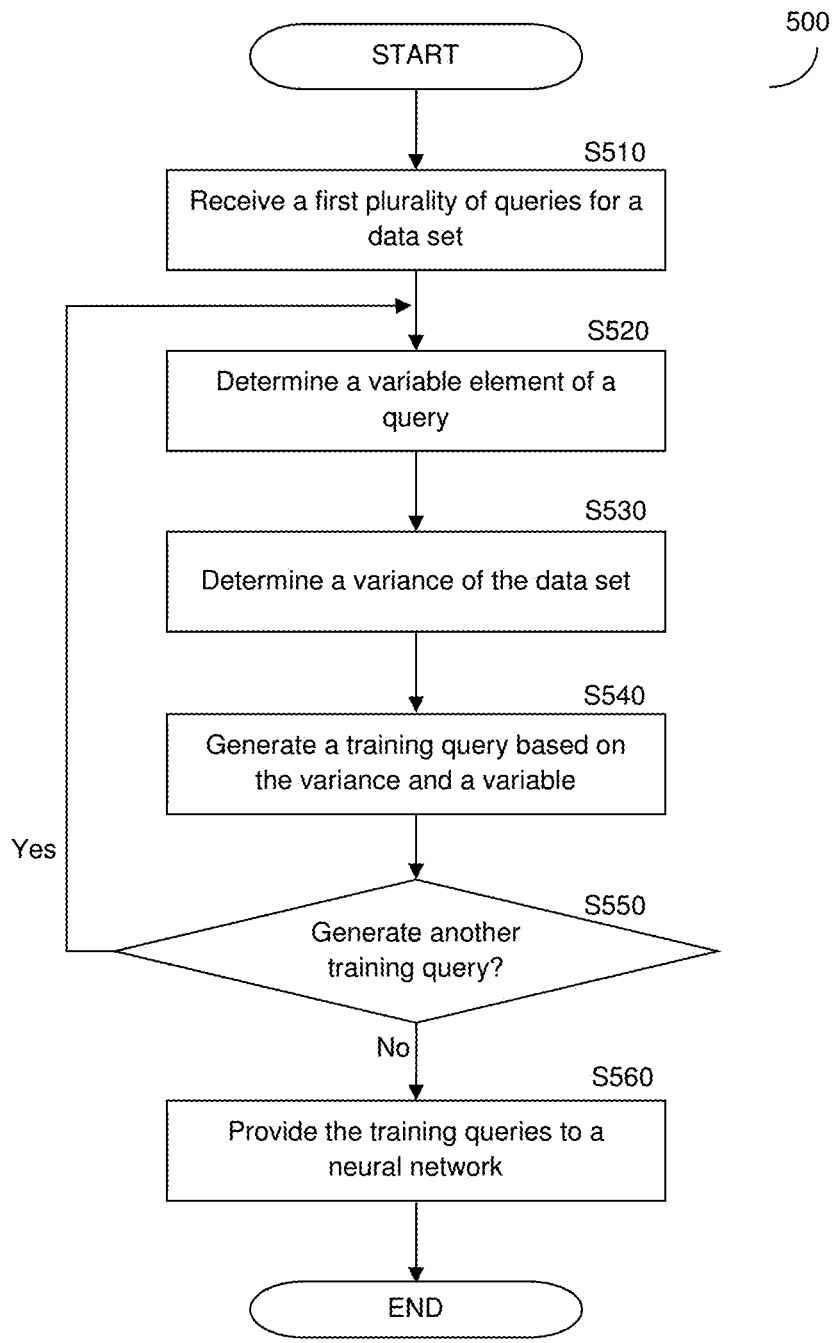
FIG. 5 is a flowchart illustrating a method for generating a query training set for a neural network according to an embodiment.

FIG. 5 is a flowchart illustrating a method 500 for generating a query training set for a neural network according to an embodiment. As noted above, the training of neural networks is required in order to provide sufficiently accurately results, where sufficiently accurate results are a percentage of predicted results matching the real results above a predetermine threshold. Training a neural network involves exposing the neural network to a plurality of training conditions and their previously calculated real results. This allows the neural network to adjust weight functions of the neurons within the neural network.

Typically, a large training set is required to achieve accurate results. However, training sets having both a sufficient depth of data (e.g., queries which require different areas of data for their results, take variance into account, and the like), and a sufficiently large quantity of query examples are not always available. Therefore, it may be advantageous to generate a qualified training set. An exemplary method is discussed herein.

At S510, a first set of queries is received, e.g., by a training set generator. The first set of queries may be queries that have been generated by one or more users, for example through user nodes. Typically, this first set of queries does not include enough queries to train a neural network to a point where the predictions are sufficiently accurate.

At S520, a variable element of a first query of the first plurality of queries is determined. For example, a query may be the following:

select sum(Income) from data where sales between 18 and 79 where the variable 'sales' has a value between 18 and 79.

At S530, a variance of the data set is determined, where a variance includes a subset of the determined variable. Following the above example where the variable 'sales' has a value between 18 and 79, the real full data set may have values ranging between 0 and 1,000. Thus, querying for the sum of income values between 18 and 79 may not be representative of the sum of income for the entire data set, which would bias the NN model. In order to avoid this, the variance of the training queries is determined to take into account this potential bias.

At S540, a training query is generated based on the determined variable and the variance thereof. In the above example, the following query will be generated:

select sum(Income) from data where sales between 24 and 82 or, as another example:

select average(Income) from data where sales between 312 and 735

In the above examples, the training set generator determines a predicate. A predicate is a term for an expression which is used to determine if the query will return true or false, e.g., the result the query is requesting, and generates the training query based on the predicate, the variable, and the variance of the query.

At S550, a determination is made whether to generate another training query. If so, execution continues at S520; otherwise execution continues at S560. The determination may be based on, for example, whether a total number of queries (real and generated) has exceeded a predetermined threshold, whether the total number of generated queries is above a threshold, and the like. For example, it may be determined if the training queries are equal to a representative sample of the data set (i.e. queries that are directed to all portions of the data, or to a number of portions of the data above a predetermined threshold). In another example, it may be determined if additional variance is required for certain predicates.

At S560, the training queries are provided to the input layer of the neural networks for training. Typically, the training queries are executed on the data set, to generate a query pair which includes the query and a real result thereof. The training queries and real results are then vectorized to a matrix representation which the neural network is fed (as described in more detail with respect to FIG. 3).

Figure 6:
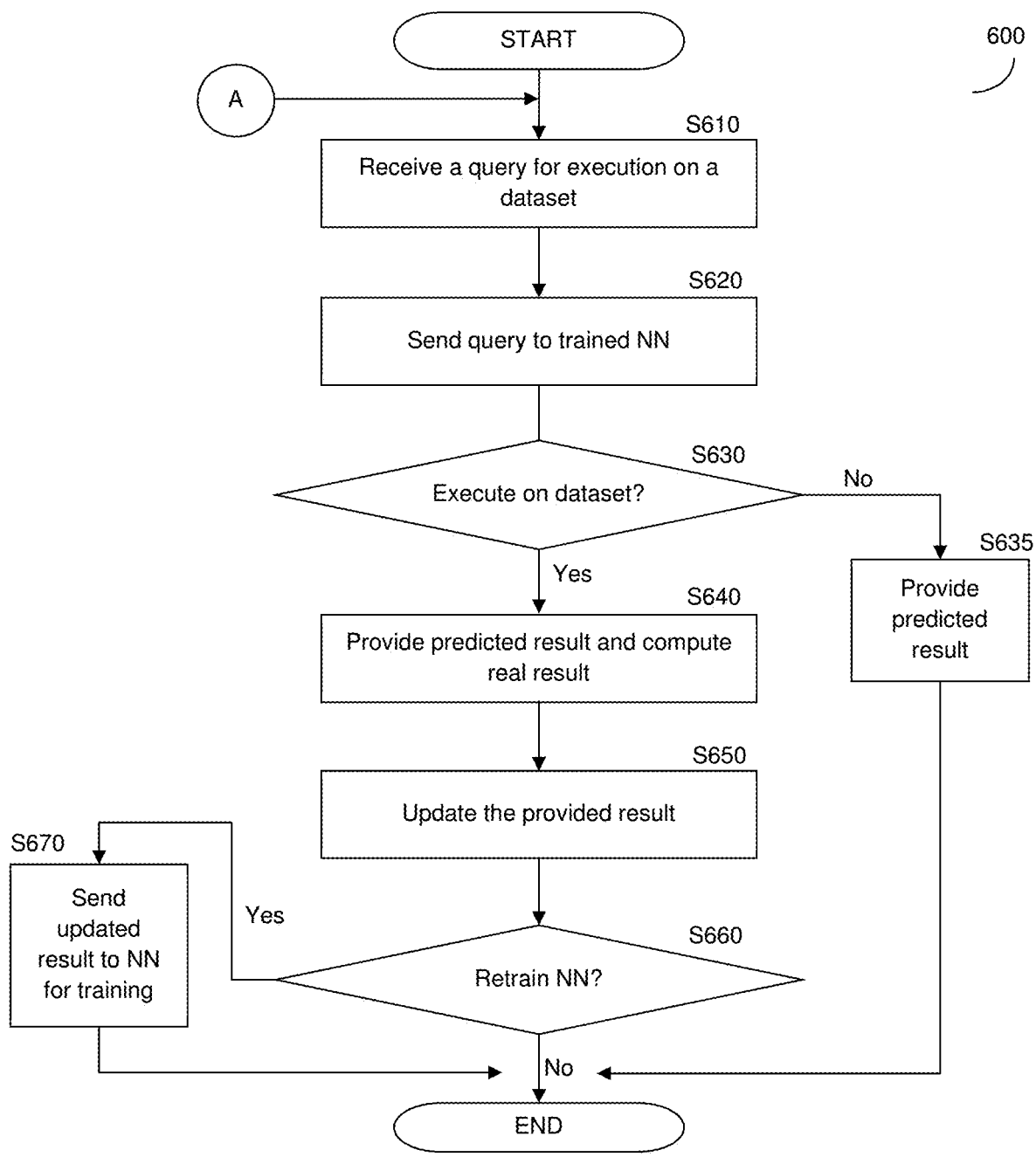
FIG. 6 is a flowchart illustrating a method for generating approximate query results for a neural network according to an embodiment.

FIG. 6 is a flowchart illustrating a method 600 for generating approximate query results for a neural network according to an embodiment. At S610, a query is received for execution on a data set. The query may be received by an approximation server from a user node, e.g., the approximation server 150 and user node 140 of FIG. 1.

At S620, the query is sent to a trained neural network. In an embodiment, it is determined if the neural network is trained to provide a sufficiently accurate response to the received query. This may be based on, for example, a version number of the neural network indicating the training level thereof.

At S630, a determination is performed to ascertain if the query should be executed on the data set. In some embodiments, it may be advantageous to first supply an approximate answer immediately as the query is received, while additionally computing the real result of the query on the data set. This determination may be based on, for example, the version number of the neural network, the resources available to run the query through the neural network, the time required to execute the query, and so on. If a real result is determined to be provided, execution continues at S640; otherwise execution continues at S635.

At S635, a first result, or a predicted result, is provided, e.g., sent to a user node where the query was received from.

At S640, the predicted result is provided, e.g., to the user node where the query was received from, while the query is executing on a relevant one or more data sets to determine the real results thereof. Execution may include sending all or part of the query to a DBMS of a database for execution thereon.

At S650, a second result, or an updated result, is provided, e.g., to the user node, where the update is based on the calculated real results. In an embodiment, a notification may be provided to indicate that the result has been updated from an approximate and predicted result to real result. The notification may be a textual notification, a visual notification (such as the text or background of the notification changing colors), and the like.

At S660, it is determined whether to use the real result to further train the neural network. For example, if the difference between the real result and the predicted result is below a second threshold, it may be determined not to train the neural network, as the results are sufficiently accurate. Alternatively, it may be determined that the same result should be used for training, even if below a second threshold, in order to reinforce the quality of the prediction. If a real result is to be used for training, execution continues at S670; otherwise execution terminates.

At S670 the query and real result are sent to the neural network as an input to the input layer of the neural network. The neural network may be trained based on its latest state, i.e., its version number. The version number may be updated every time the neural network is trained based on the real result and the predicted result.

In an example embodiment, an approximation server of the neural network receives a plurality of queries and their real results, e.g., from S640, and stores them for periodically training the neural network. In another example embodiment, the query and result may be used by a training set generator to generate another set of training queries. In certain embodiments where the neural network further includes a version number, the version number may be updated each time the neural network is retrained. A copy with a version number of the neural network may be stored on any of the devices discussed with respect to FIGS. 1A and 1B above.

In an embodiment, the received query may be provided to a plurality of neural networks to be executed on each of their models, e.g., at S620, where at least two NN of the plurality of NNs differ from each other in the number of layers and/or neurons. For example, a first neural network will receive the query and generate a first predicted result. The first predicted result may be sent to a user node, sent to a dashboard, report, and the like. In parallel, or subsequently, the query is sent to a second neural network that has more layers, neurons, or both, than the first neural network.

Upon receiving a second predicted result from the second neural network, the result available to the user node may be updated, e.g., at S650. In certain embodiments, a loss function may be determined and a result thereof generated, for example by the approximation server. A loss function may be, for example, a root mean squared error. The loss function may be used to determine a confidence level of the predication of a neural network. In an embodiment, it may be desirable to provide the query to the "leanest" neural network (i.e. the NN with the least a number of layers, neurons, or both), which would require less computational resources.

A confidence level may be determined for the prediction, and if it falls below a threshold (i.e., the confidence level is too low) then the query may be provided to the next neural network, which would require more computational resources than the first NN, but may require less computational resources than a third NN or than executing the query on the data set itself to generate real results.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating approximations of query results, comprising:
    sending a received query from an approximation system to a neural network, wherein the received query is executable on a target data set, wherein the received query is sent from a user node and received at the approximation system, wherein the user node is a device having initiated the received query;
    receiving, at the approximation system from the neural network, a predicted result to the received query;
    providing the predicted result as a first output to the user node;
    determining a real result of the query from a data set stored in the database when the predicted result is insufficiently accurate; and
    providing the real result as a second output to the user node.

2. The method of claim 1, further comprising:
    determining if the predicted result is within a predetermined threshold of the real result.

3. The method of claim 2, further comprising:
    providing the second output when the predicted result falls outside the predetermined threshold of the real result, wherein the second output is provided to the user node after the first output is provided to the user node.

4. The method of claim 3, further comprising:
    sending the real result to the neural network when the predicted result falls outside of the predetermined threshold of the real result, wherein the real result is utilized to train the neural network.

5. The method of claim 4, wherein training the neural network further comprises: adjusting a weight value of at least one neuron of a plurality of neurons based on a comparison between the predicated result and the real result.

6. The method of claim 1, wherein the neural network comprises a plurality of neurons configured to generate the predicted result, and wherein each neuron is assigned a weight value.

7. The method of claim 1, wherein the predicted result is provided without querying the database with the received query.

8. The method of claim 1, further comprising:
    querying the database with the received query to provide the real result.

9. A non-transitory computer readable medium having stored thereon instructions for causing a processing circuitry to perform a process of generating approximations of query results, the process comprising:
    sending a received query from an approximation system to a neural network, wherein the received query is executable on a target data set, wherein the received query is sent from a user node and received at an approximation system, wherein the user node is a device having initiated the received query;
    receiving, at the approximation system from the neural network, a predicted result to the received query;
    providing the predicted result as a first output to the user node;
    determining a real result of the query from a data set stored in the database when the predicted result is insufficiently accurate; and
    providing the real result as a second output to the user node.

10. A system for generating approximations of query results, comprising:
    a processing circuitry; and
    a memory, the memory containing instructions that, when executed by the processing circuitry, configure the system to:
    send a received query to a neural network, wherein the received query is executable on a target data set, wherein the received query is sent from a user node and received at the system, wherein the user node is a device having initiated the received query;
    receive from the neural network a predicted result to the received query;
    provide the predicted result as a first output to the user node;

determine a real result of the query from a data set stored in the database when the predicted result is insufficiently accurate; and provide the real result as a second output to the user node.

11. The system of claim 10, wherein the system is further configured to:

determine if the predicted result is within a predetermined threshold of the real result.

12. The system of claim 11, wherein the system is further configured to:

provide the second output when the predicted result falls outside the predetermined threshold of the real result, wherein the second output is provided to the user node after the first output is provided to the user node.

13. The system of claim 12, wherein the system is further configured to:

send the real result to the neural network when the predicted result falls outside of the predetermined threshold of the real result, wherein the real result is utilized to train the neural network.

14. The system of claim 13, wherein the system is further configured to:

adjust a weight value of at least one neuron of a plurality of neurons based on a comparison between the predicated result and the real result.

15. The system of claim 10, wherein the neural network comprises a plurality of neurons configured to generate the predicted result, and wherein each neuron is assigned a weight value.

16. The system of claim 10, wherein the predicted result is provided without querying the database with the received query.

17. The system of claim 10, wherein the system is further configured to:

query the database with the received query to provide the real result.

18. The system of claim 10, wherein the system further comprises a neural computer.

19. The system of claim 18, wherein the neural computer comprises at least one of: a von-Neumann multiprocessor, a graphical processing unit (GPU), a vector processor, an array processor, and a tensor processing unit.

20. A system for generating approximations of query results, comprising:

an approximation server;

a neural network; and wherein the approximation server is configured to:

send a received query to a neural network, wherein the received query is executable on a target data set, wherein the received query is sent from a user node and received at the approximation server, wherein the user node is a device having initiated the received query;

receive from the neural network a predicted result to the received query;

provide the predicted result as a first output to the user node;

determine a real result of the query from the data set, when the predicted result is insufficiently accurate; and provide the real result as a second output to the user node.

* * * * *